(12) United States Patent
Nakada

(10) Patent No.: US 10,203,592 B2
(45) Date of Patent: Feb. 12, 2019

(54) IMAGE PROJECTION APPARATUS

(71) Applicant: CANON KABUSHIKI KAISHA, Tokyo (JP)

(72) Inventor: Masahiro Nakada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/694,028

(22) Filed: Sep. 1, 2017

(65) Prior Publication Data

US 2018/0067385 A1    Mar. 8, 2018

(30) Foreign Application Priority Data

Sep. 8, 2016  (JP) .................................. 2016-175191

(51) Int. Cl.
| | |
|---|---|
| G03B 21/20 | (2006.01) |
| G03B 21/14 | (2006.01) |
| G02B 27/28 | (2006.01) |
| G03B 21/00 | (2006.01) |
| G03B 33/12 | (2006.01) |

(52) U.S. Cl.
CPC ......... G03B 21/204 (2013.01); G03B 21/142 (2013.01); G03B 21/208 (2013.01); G03B 21/2066 (2013.01); *G02B 27/283* (2013.01); *G03B 21/006* (2013.01); *G03B 33/12* (2013.01)

(58) Field of Classification Search
CPC ...... G03B 21/006; G03B 21/14; G03B 21/20; G03B 21/28; G03B 21/142; G03B 21/208
See application file for complete search history.

(56) References Cited

U.S. PATENT DOCUMENTS

| | | |
|---|---|---|
| 8,820,940 B2 | 9/2014 | Kita |
| 8,858,000 B2 | 10/2014 | Tsuda et al. |
| 9,063,403 B2 | 6/2015 | Tsuda et al. |
| 9,621,862 B2 | 4/2017 | Nobori |
| 9,632,403 B2 | 4/2017 | Inoko |
| 2005/0001997 A1* | 1/2005 | Kawaai .................. G03B 21/10 353/97 |

(Continued)

FOREIGN PATENT DOCUMENTS

JP         5770433 B2    8/2015

*Primary Examiner* — Sultan Chowdhury
(74) *Attorney, Agent, or Firm* — Rossi, Kimms & McDowell LLP

(57) ABSTRACT

The image projection apparatus includes a wavelength conversion element, an illumination optical system including a reflective-transmissive surface reflecting a first light and transmitting a second light, guiding the reflected first light to the wavelength conversion element, and allowing the illumination light to exit therefrom while making part of the illumination light incident on the reflective-transmissive surface. The illumination optical system or a projection optical system includes a light limiter changing a sectional area of the illumination light used for producing an image light projected to the projection surface. The reflective-transmissive surface is provided such that an incident area of the illumination light on the reflective-transmissive surface decreases with a decrease in the sectional area of the illumination light, and that the incident area of the illumination light increases with an increase in the sectional area of the illumination light.

7 Claims, 11 Drawing Sheets

(56) References Cited

U.S. PATENT DOCUMENTS

| | | | | |
|---|---|---|---|---|
| 2011/0043767 A1* | 2/2011 | Kodama | ............ | G02B 27/1026 |
| | | | | 353/37 |
| 2012/0133904 A1* | 5/2012 | Akiyama | ............. | G02B 27/102 |
| | | | | 353/38 |
| 2012/0293774 A1* | 11/2012 | Inoue | ..................... | G02B 13/04 |
| | | | | 353/31 |
| 2013/0250255 A1* | 9/2013 | Kurosaki | ................. | F21V 13/08 |
| | | | | 353/85 |
| 2015/0036107 A1* | 2/2015 | Nagahara | ............. | G03B 21/208 |
| | | | | 353/31 |
| 2015/0316840 A1* | 11/2015 | Maeda | ................. | H04N 9/3158 |
| | | | | 353/31 |
| 2016/0062220 A1* | 3/2016 | Kato | .................. | G03B 21/2013 |
| | | | | 353/31 |

\* cited by examiner

IMAGE PROJECTION APPARATUS

BACKGROUND OF THE INVENTION

Field of the Invention

The present invention relates to an image projection apparatus (hereinafter referred to as "a projector") using a wavelength conversion element.

Description of the Related Art

As a light source of projectors, Japanese Patent No, 5770433 discloses a wavelength conversion light source that projects a blue light from a laser diode to a wavelength conversion element (fluorescent body) and converts thereby a wavelength of part of the blue light to generate a yellow light (that is, green and red lights). This produces a white light including the blue and yellow lights.

This wavelength conversion light source includes, in an optical path for extracting the white light produced by the wavelength conversion element as an illumination light, a light guiding surface (such as a polarization beam splitter) that reflects the blue light from the laser diode. This light guiding surface has a characteristic of reflecting the blue light having a specific polarization direction and of transmitting the yellow light having a polarization direction orthogonal to the specific polarization direction. The produced white light is guided as the illumination light to a light modulation element such as a liquid crystal panel through an illumination optical system, and is converted thereby into an image light. The image light forming a projected image is projected through a projection optical system to a projection surface such as a screen.

However, in the wavelength conversion light source disclosed in Japanese Patent No, 5770433, the light guiding surface provided in the optical path of the illumination light reflects a certain amount of the blue light in the illumination light. Therefore, a change in sectional area of the illumination light used for producing the image light due to a change in diameter of an aperture stop in the illumination optical system for contrast adjustment or a change in F-number of the projection optical system due to its variation of magnification changes a ratio of the yellow light reflected by the light guiding surface to the entire illumination light. This results in a change in color of the illumination light guided to the light modulation element and thereby results in a change in color of the projected image.

SUMMARY OF THE INVENTION

The present invention provides an image projection apparatus capable of reducing, while providing a light guiding surface as a reflective-transmissive surface in an optical path of an illumination light from a wavelength conversion element, changes in colors of the illumination light and a projected image regardless of a change in sectional area of the illumination light.

The present invention provides an aspect thereof an image projection apparatus including a wavelength conversion element configured to convert part of a first light into a second light whose wavelength is different from that of the first light to generate an illumination light including the first and second lights, an illumination optical system including a reflective-transmissive surface that has a characteristic of reflecting the first light and transmitting the second light, configured to guide the first light reflected by the reflective-transmissive surface to the wavelength conversion element, and configured to allow the illumination light to exit from the illumination optical system while making part of the illumination light incident on the reflective-transmissive surface, an image light producer configured to produce, using the illumination light from the illumination optical system, an image light for displaying a projected image, and a projection optical system configured to project the image light to a projection surface. The illumination optical system or the projection optical system includes a light limiter configured to change a sectional area of the illumination light used for producing the image light projected to the projection surface. The reflective-transmissive surface is provided such that an incident area of the illumination light on the reflective-transmissive surface decreases with a decrease in the sectional area of the illumination light, and that the incident area of the illumination light increases with an increase in the sectional area of the illumination light.

Further features of the present invention will become apparent from the following description of exemplary embodiments with reference to the attached drawings.

DESCRIPTION OF THE EMBODIMENTS

Figure 1:
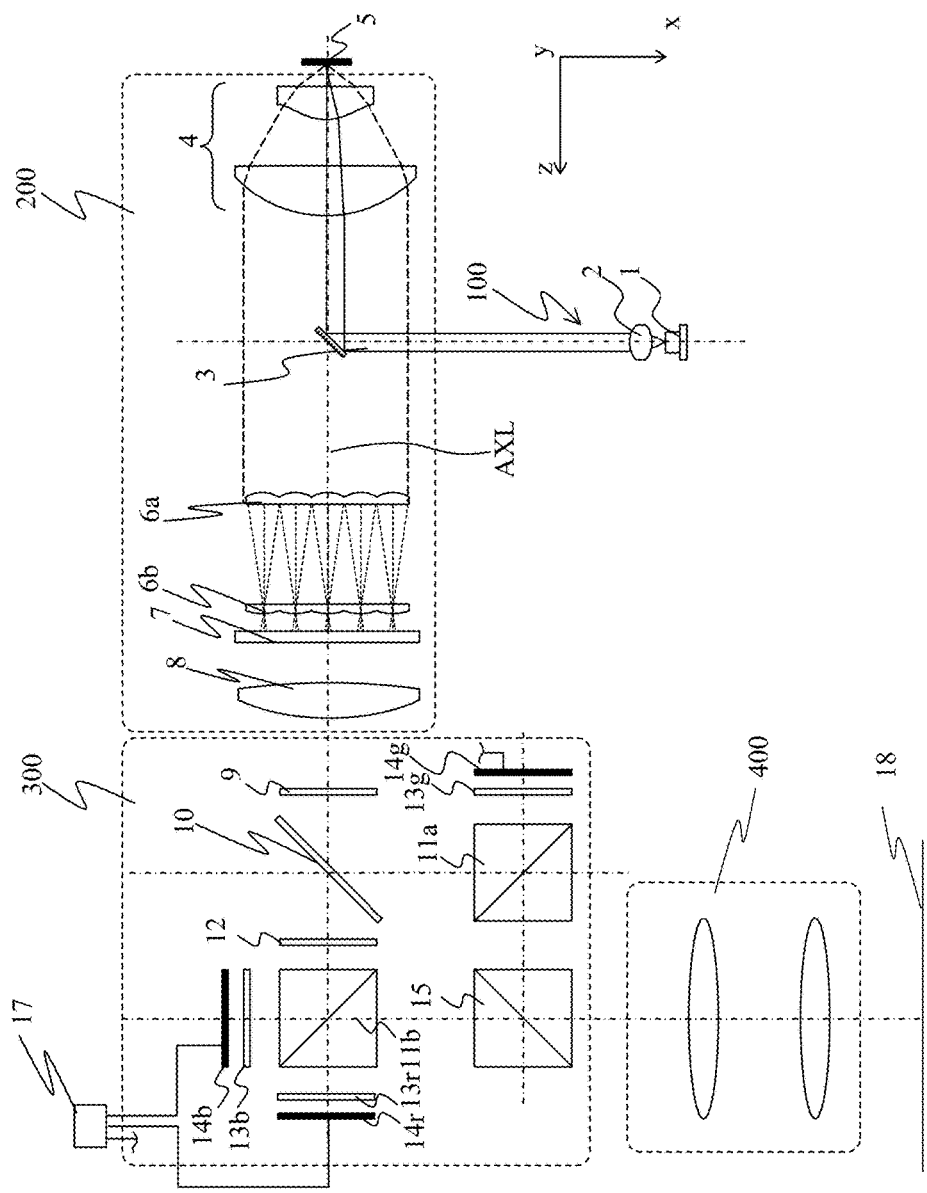
FIG. 1 illustrates a basic configuration of a projector that is an embodiment of the present invention.

Exemplary embodiments of the present invention will be described below with reference to the accompanied drawings. First, prior to description of specific embodiments, description will be made of a basic configuration of a projector as an image projection apparatus that is an embodiment of the present invention with reference to FIG. 1.

A light source system 100 includes a laser diode (LD) light source 1, a collimator lens 2, a dichroic mirror 3, a collector lens unit 4, and a fluorescent body unit 5. The LD light source 1 emits a blue laser light (hereinafter referred to as "a blue light"). The collimator lens 2 converts the blue light as divergent light from the LD light source 1 into collimated light. The blue light emitted from the LD light source 1 and collimated by the collimator lens 2 reaches a reflective-transmissive surface of the dichroic mirror 3.

The reflective-transmissive surface has a characteristic of reflecting the blue light and transmitting a yellow light (including a green light and a red light). The blue light from the LD light source 1 reflected by the reflective-transmissive surface of the dichroic mirror 3 is collected by a collector lens unit 4 constituting part of an illumination optical system 200 described later and progresses toward the fluorescent body unit 5.

The dichroic mirror 3 is formed by applying a dichroic coat on an entire or part of a surface of a glass substrate. The reflective-transmissive surface is a region where the dichroic coat is applied in the dichroic mirror 3.

In this embodiment, the dichroic coat is applied on the entire surface of the glass substrate, and thereby the dichroic mirror 3 corresponds to the reflective-transmissive surface.

The collector lens unit 4 that includes multiple lenses each having a positive power collects the blue light from the dichroic mirror 3 toward the fluorescent body unit 5, and collects an illumination light (described later) emitted from the fluorescent body unit 5 to convert it into collimated light.

The fluorescent body unit 5 as a wavelength conversion element includes a wavelength conversion layer including a fluorescent body, and a substrate supporting the wavelength conversion layer.

The wavelength conversion layer converts, by the fluorescent body, part of the blue light (first light) as an exciting light entering thereto into a yellow light (second light) as a fluorescent light whose wavelength is longer than that of the blue light. The yellow light reflected directly by the fluorescent body or reflected by a reflective film formed on the substrate exits from the fluorescent body unit 5 toward the collector lens unit 4.

On the other hand, the blue light as an unconverted light that is not wavelength-converted into the fluorescent light in the wavelength conversion layer is diffusively reflected by diffusive bodies included in the wavelength conversion layer or is reflected by the reflective film on the substrate to exit as the blue light from the fluorescent body unit 5 toward the collector lens unit 4. Thus, the illumination light as a white light including the yellow light (that is, the red and green lights) and the blue light exits from the fluorescent body unit 5.

When viewed from an optical axis direction where an optical axis AXL of the collector lens unit 4 extends, a projected area of the dichroic mirror 3 projected to a plane orthogonal to the optical axis AXL is smaller than areas of cross-sections (orthogonal to the optical axis AXL) of the collector lens unit 4 and the illumination light therefrom. Therefore, the illumination light converted into the collimated light by the collector lens unit 4 progresses toward a first fly-eye lens 6a described later while part of the illumination light is made incident on the dichroic mirror 3.

In the following description, a region on the plane orthogonal to the optical axis AXL of the collector lens unit 4 to which the dichroic mirror 3 is projected is referred to as "an optical axis direction projected region of the dichroic mirror 3", and an area of the region is referred to as "an optical axis direction projected area of the dichroic mirror 3".

In addition, in the following description, sections and areas of the illumination light, the fluorescent light and the unconverted light respectively mean sections thereof orthogonal to the optical axis AXL and areas (cross-sectional areas) of the sections.

The yellow light of the illumination light reaching the dichroic mirror 3 is transmitted therethrough to enter the first fly-eye lens 6a of the illumination optical system 200.

On the other hand, the blue light of the illumination light reaching the dichroic mirror 3 is reflected thereby to be returned toward the collimator lens 2 and the LD light source 1. Therefore, a light intensity of the blue light on the optical axis direction projected region of the dichroic mirror 3 in the cross-section of the illumination light progressing toward the first fly-eye lens 6a is lower (approximately 0) than that on other regions than the optical axis direction projected region of the dichroic mirror 3. A ratio of the yellow light and the blue lights that exit from the fluorescent body unit 5 is set in consideration of the blue light reflected by the dichroic mirror 3 in the illumination light such that the illumination light entering the first fly-eye lens 6a becomes the white light.

Furthermore, of the illumination light, the blue light reflected by the dichroic mirror 3 and thereby returned toward the LD light source 1 becomes a loss, and therefore it is desirable that the optical axis direction projected area be as small as possible.

The illumination optical system 200 includes, in addition to the collector lens unit 4 and the first fly-eye lens 6a described above, a second fly-eye lens 6b, a polarization conversion element 7, and a condenser lens 8. The optical axis AXL of the collector lens unit 4 is also an optical axis of the illumination optical system 200.

The first fly-eye lens 6a including multiple lens cells divides the entering illumination light into multiple light fluxes, and causes the multiple light fluxes to form multiple light source optical images near the second fly-eye lens 6b. The second fly-eye lens 6b includes multiple lens cells respectively corresponding to the multiple lens cells of the first fly-eye lens 6a.

The polarization conversion element 7 provided after the second fly-eye lens 6b is constituted by multiple polarization beam splitters and multiple $\lambda/2$ plates, and converts the entering illumination light (divided light fluxes) as a non-polarized light into linearly polarized light having a specific polarization direction. The polarization conversion element 7 in this embodiment converts the illumination light into an s-polarized light.

The illumination light from the polarization conversion element 7 is condensed by the condenser lens 8 to be overlapped with each other on three liquid crystal panels 14 (14r, 14g and 14b) as image light production elements (light modulation elements). Thereby, each liquid crystal panel 14 is evenly illuminated.

This embodiment uses a reflective liquid crystal panel as the liquid crystal panel 14 that is the image light production element. However, as the image light production element, a transmissive liquid crystal element and a digital micromirror device may be used.

The illumination light (s-polarized light) condensed by the condenser lens 8 enters a color separation-combination system 300. In the color separation-combination system 300, the illumination light first enters a polarizing plate 9 that increases its polarization degree and then reaches a dichroic mirror 10. The dichroic mirror 10 has a characteristic of reflecting a green light and transmitting a magenta light (including blue and red lights), and thereby divides the white light from the polarizing plate 9 into the green light and the magenta light.

A retarder 12 rotates a polarization direction of the red light by 90 degrees to convert it into a p-polarized light, and transmits the blue light as the s-polarized light without change.

Polarization beam splitters 11 (11a and 11b) have a characteristic of reflecting an s-polarized light and transmitting a p-polarized light, and reflects or transmits red, green and blue lights depending on their polarization directions to thereby guide these lights to the corresponding liquid crystal panels 14 (14r, 14g and 14b). Specifically, the polarization beam splitter 11a reflects the green light (s-polarized light) reflected by the dichroic mirror 10 to guide it to the reflective liquid crystal panel 14g for green. On the other hand, the polarization beam splitter 11b transmits the blue light (s-polarized light) from the retarder 12 to guide it to the liquid crystal panel 14b for blue, and reflects the red light (p-polarized light) to guide it to the liquid crystal element 14r for red.

Furthermore, λ/4 plates 13r, 13g and 13b each gives to each color light a phase difference of λ/2 in its reciprocation therethrough to increase an analyzing effect.

A driver 17 drives the liquid crystal panels 14 depending on an image signal input from outside the projector. Thereby, each liquid crystal panel 14 modulates each entering color light to produce an image light whose polarization direction is changed, and reflects each color image light.

The green image light (p-polarized light) is transmitted through the polarization beam splitter 11a to be guided to a dichroic prism 15. The blue image light (p-polarized light) and the red image light (s-polarized light) are respectively transmitted through and reflected by the polarization beam splitter 11b to be guided to the dichroic prism 15.

The dichroic prism 15 has a characteristic of reflecting a green light and transmitting a magenta light, and thereby combines the green image light with the blue and red image lights to guide these image lights thus combined (that is, a color-combined image light) to a projection lens 400 as a projection optical system. The projection lens 400 enlarges and projects the color-combined image light to a projection surface 18 such as a screen, and thereby a projected image as a full-color image is displayed.

Next, description will be made of a change in color of the illumination light (that is, of the projected image) caused by a change in aperture diameter of the aperture stop. The change in aperture diameter is associated with a variation of magnification of the projection lens 400 for changing a size of the projected image or is performed for contrast adjustment. The ratio of the yellow light as the fluorescent light in the illumination light and the blue light as the unconverted light therein can be adjusted by changing a diffusion degree of the blue light corresponding to an amount of the diffusive bodies in the wavelength conversion layer.

Figure 2:
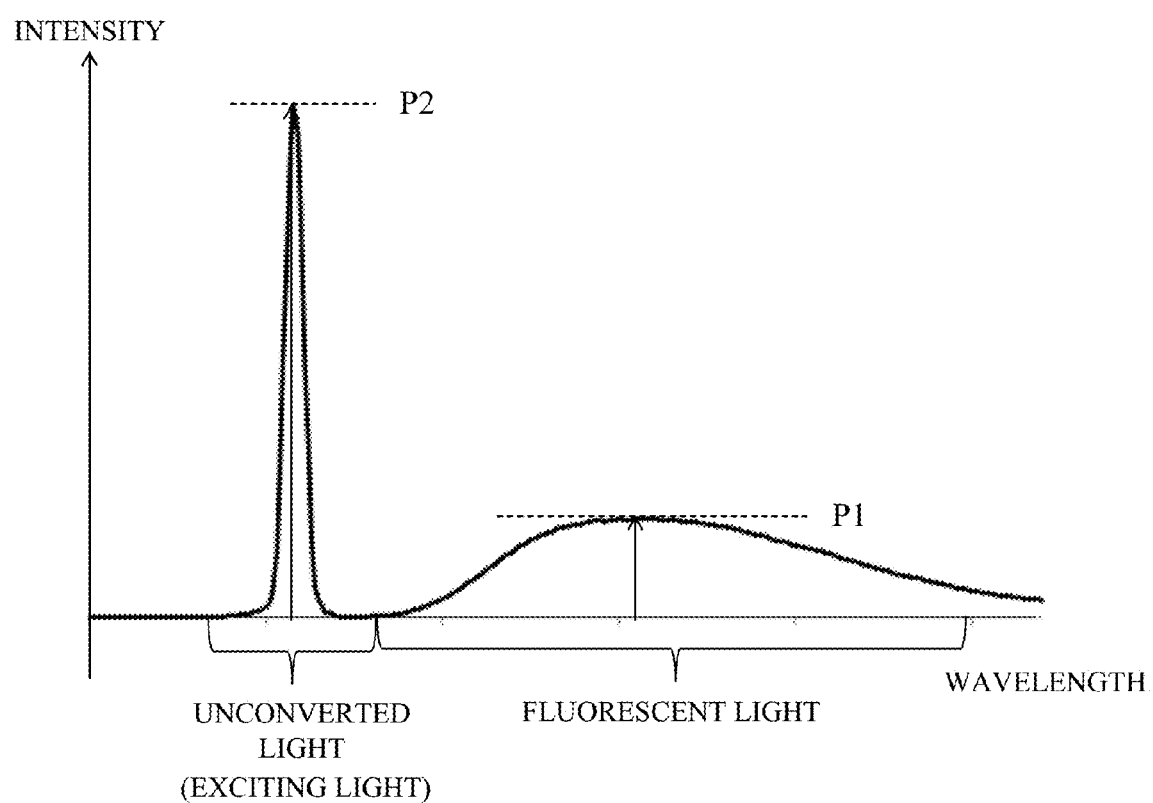
FIG. 2 illustrates a spectrum of an illumination light including a fluorescent light and an unconverted light.

FIG. 2 illustrates a spectrum of the illumination light. In FIG. 2, P1 represents a height of a spectrum peak of the fluorescent light, and P2 represents a spectrum peak of the unconverted light (exciting light).

Changing the diffusion degree of the exciting light can adjust P2. Increasing P2 decreases an amount of the exciting light converted into the fluorescent light to thereby decrease P1. Conversely, decreasing P2 increases the amount of the exciting light converted into the fluorescent light to thereby increase P1. Such a relation between P1 and P2 in a chromaticity diagram changes approximately linearly. A slope and an intercept of a straight line indicating this linearity depend on type of the fluorescent body.

For example, selecting on the straight line a point closest to a black body locus enables setting a white having a proper chromaticity (that is, a proper white balance). When a state in which the white having the proper chromaticity is set is defined as a standard state, a ratio of P1 and P2 in the standard state is fixed.

In the following description, intensity distributions of the fluorescent light and the unconverted light are both approximately even, A0 represents a cross-sectional area of the fluorescent light in the standard state, and B0 represents a cross-sectional area of the unconverted light in the standard state. Furthermore, A1 and B1 respectively represent cross-sectional areas of the fluorescent light and the unconverted light that are changed (decreased) with a change in cross-sectional area of the illumination light (hereinafter referred to as "light limitation") by a light limiter described later.

Spectrum peaks of the fluorescent light and the unconverted light after their cross-sectional areas are decreased by the light limitation are calculated as follows by multiplying each spectrum peak thereof in the standard state by a ratio of the cross-sectional areas before and after the change.

$$A1/A0 \times P1$$

$$B1/B0 \times P2$$

If a ratio of the cross-sectional areas of the fluorescent light and the unconverted light in a state after the light limitation (hereinafter referred to as "a light limitation state") is equal to that in the standard state, colors of the illumination light and the projected image are not changed.

When a decrease ratio of each of the fluorescent light and the unconverted light is referred to as "a cross-sectional area decrease ratio", the cross-sectional area decrease ratios of the fluorescent light and the unconverted light are expressed as follows.

$$(A0-A1)/A0$$

$$(B0-B1)/B0$$

When C represents an area of the optical axis direction projected region (hereinafter referred to as "an optical axis direction projected area") of the dichroic mirror 3, A0, B0 and C have a relation of A0−C=B0, so that the following relation is established.

$$(B0-B1)/B0=(A0-C-B1)/(A0-C)$$

Figure 3:
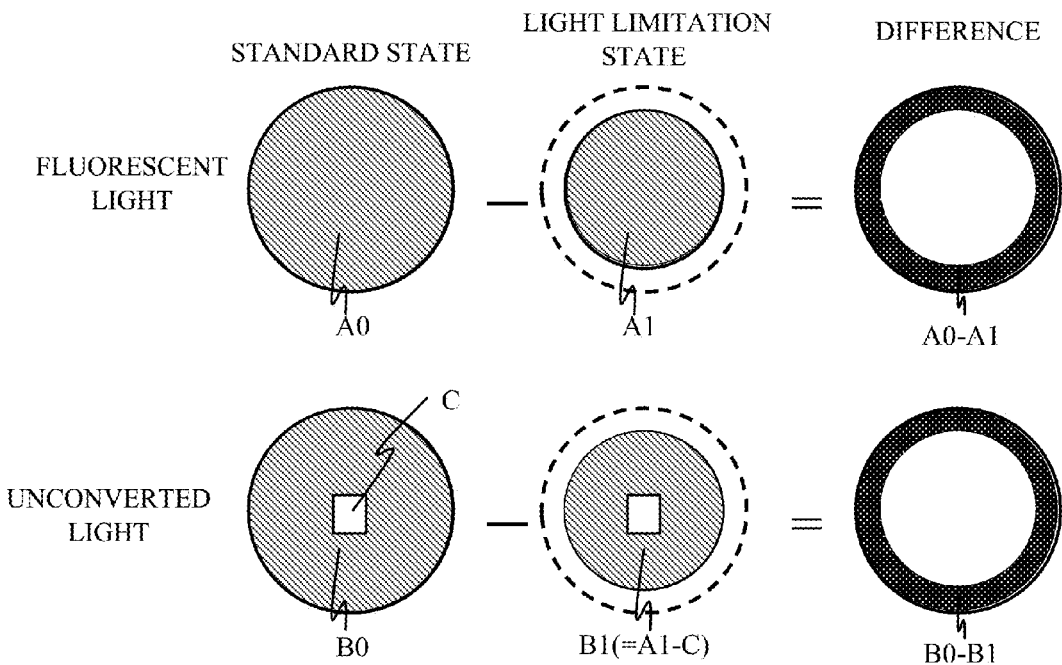
FIG. 3 illustrates a change in light sectional area by light limitation in the embodiment (when a dichroic mirror is not decentered).

In the light limitation state, an outer edge side region (hereinafter referred to as "a light limitation region") of an optical path common to the fluorescent light and the unconverted light is spatially blocked. In this state, when a center side region of the optical path that is not blocked entirely includes the optical axis direction projected region of the dichroic mirror 3, C=A1−B1 as illustrated in FIG. 3, so that the following relation is established.

$$(B0-B1)/B0=(A0-A1)/(A0-C) \qquad (1)$$

That is, whereas numerators of the fluorescent light and the unconverted light are equal to each other, a denominator of the unconverted light is smaller than that of the fluorescent light, so that the cross-sectional area decrease ratio of the unconverted light is greater than that of the fluorescent light.

For example, a condition that A0=100, B0=90, A1=80, C=A0−B0=A1−B1=10 and the ratio of the cross-sectional areas (that is, light amounts) of the fluorescent light and the unconverted light in the standard state is 100:90 provides a proper white illumination light. Under this condition, decreased amounts of the cross-sectional areas of the fluorescent light and the unconverted light from the standard state to the light limitation state are each 20 (that is, A1=80, B1=70).

However, whereas the cross-sectional area decrease ratio of the fluorescent light is 20% (=20/100) because its cross-sectional area is decreased from A0=100 in the standard state, the cross-sectional area decrease ratio of the unconverted light is 22.2% (=20/90) because its cross-sectional area is decreased from B0=90 in the standard state. Thus, the blue light as the unconverted light decreases more than the yellow light as the fluorescent light, which results in a change in color of the illumination light toward yellow.

In expression (1), B0, A0, C and A1 are constants, and B1 is calculated by subtracting the optical axis direction projected area C from the cross-sectional area A1 of the fluorescent light in the light limitation state. Therefore, selecting the position of the dichroic mirror 3 enables changing B1.

That is, when the dichroic mirror 3 is disposed such that the light limitation region overlaps with (or includes a region common to) at least part of the optical axis direction projected region of the dichroic mirror 3, B1 is expressed by the following expression where α is a numerical value equal to or larger than 0 and smaller than 1.

$$B1=A1-(1-\alpha)C$$

In this case, expression (1) is expressed as follows.

$$(B0-B1)/B0=(A0-A1-\alpha C)/(A0-C)$$

This expression means that not only the denominator decreases, but also the numerator decreases by the area of the common region. Therefore, it is possible to reduce a difference between the cross-sectional area decrease ratio of the unconverted light and that of the fluorescent light as compared with a case where there is not the common region, which enables reducing the color changes of the illumination light and the projected image due to the light limitation.

However, in order to provide the common region when (the optical axis direction projected region of) the dichroic mirror 3 is located on the optical axis AXL of the illumination optical system 200, it is necessary to sufficiently increase an area of the light limitation region. On the other hand, the light limitation region should be provided originally as a region necessary to achieve certain effects such as magnification of variation and contrast improvement, and therefore the area of the light limitation region has an upper limit.

Figure 4:
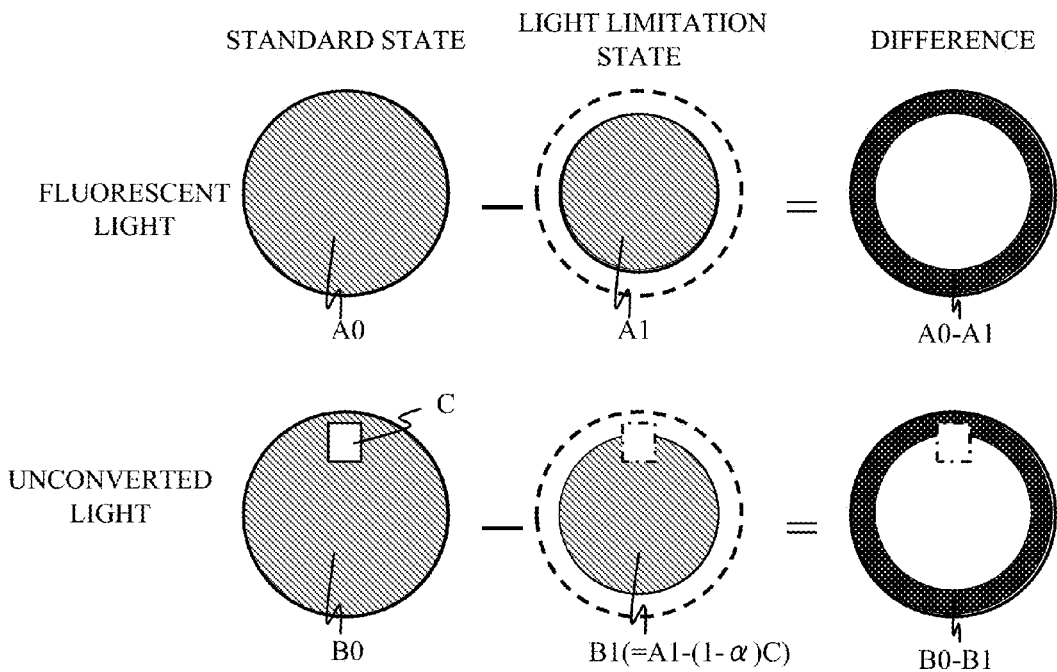
FIG. 4 illustrates a change in light sectional area by light limitation in the embodiment (when the dichroic mirror is decentered).

Thus, in this embodiment as illustrated in FIG. 4, the dichroic mirror 3 is disposed at a position decentered relative to the optical axis AXL of the illumination optical system 200. In more detail, the dichroic mirror 3 is disposed such that, in the cross-section of the illumination light, a centroid of the optical axis direction projected region of the dichroic mirror 3 is decentered relative to the optical axis AXL of the illumination optical system 200.

A decentering amount of the dichroic mirror 3 relative to the optical axis AXL is set as follows. The decentering amount is set such that a decrease and an increase in cross-sectional area of an effective region further inside than the light limitation region of the illumination light (that is, in cross-sectional area of an effective illumination light used for producing the image light projected to the projection surface) respectively decreases and increases an incident area of the illumination light on the dichroic mirror 3. Furthermore, the decentering amount is set such that the decrease and the increase in cross-sectional area of the effective region of the illumination light respectively always simultaneously decreases and increases the incident area of the illumination light on the dichroic mirror 3.

The decrease and the increase in the incident area of the illumination light correspond to a decrease and an increase in light amount of the unconverted light reflected by the dichroic mirror 3 in the illumination light. This setting enables reducing the difference between the cross-sectional area decrease ratio of the unconverted light and that of the fluorescent light without increasing the area of the light limitation region, and thereby enables reducing the color changes of the illumination light and the projected image due to the light limitation.

However, setting an excessively large decentering amount of the dichroic mirror 3 such that the dichroic mirror 3 is entirely out of the cross section of the illumination light makes it necessary to place the LD light source 1 far from the illumination optical system 200 in a direction orthogonal to the optical axis AXL. This undesirably results in an increase in size of the entire optical system.

The above-described configuration enables reducing the color changes of the illumination light and the projected image due to the light limitation. Hereinafter, description will be made of specific embodiments.

Embodiment 1

Figure 5:
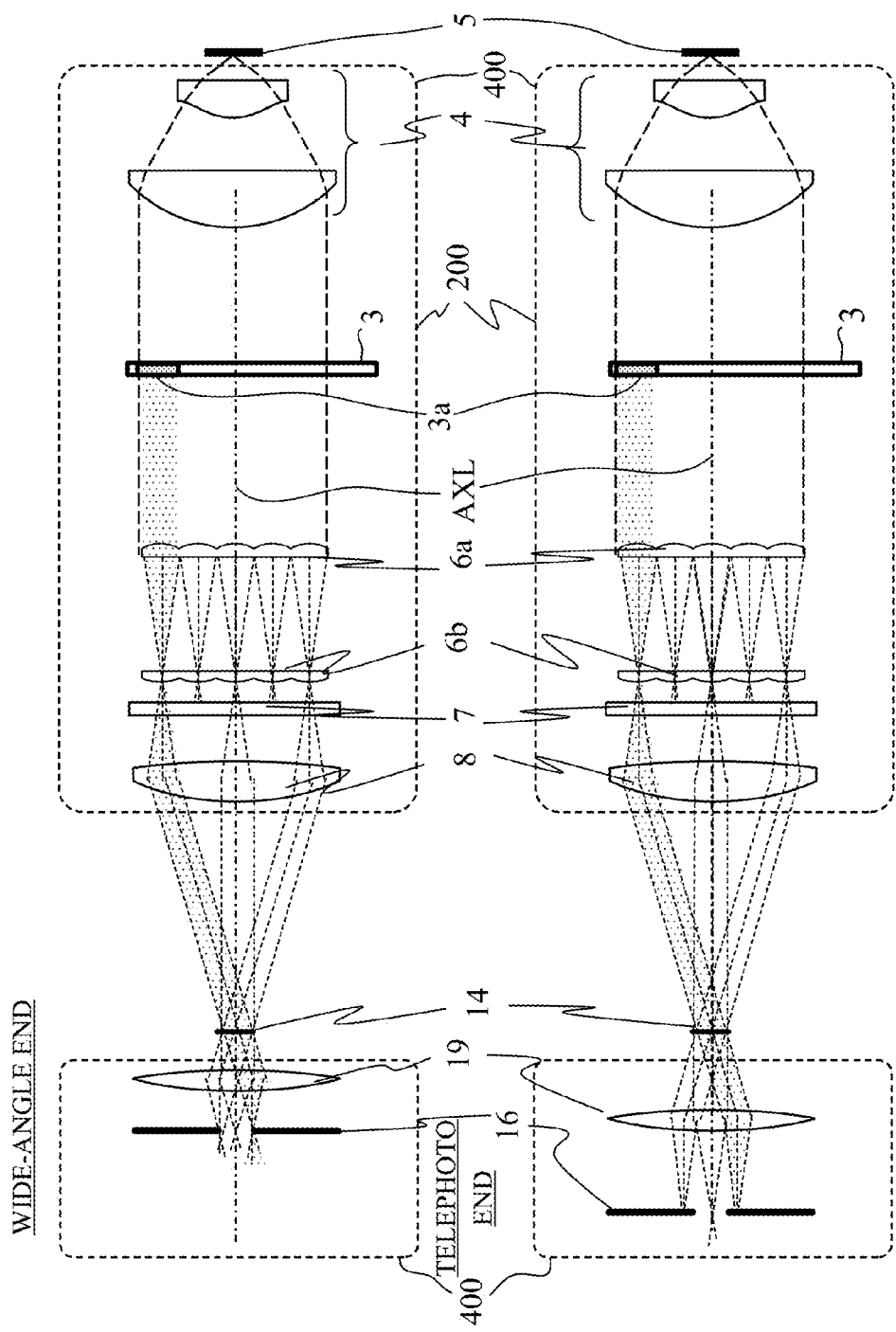
FIG. 5 illustrates a configuration of a projector that is Embodiment 1.

A first embodiment (Embodiment 1) will describe a case where the light limiter is an F-number of the projection lens 400 with reference to FIG. 5.

When the projection lens 400 is a zoom lens capable of varying its magnification, the variation of magnification often changes the F-number of the projection lens 400. When the variation of magnification changes the F-number of the projection lens 400, a lens unit 19 located further front than an aperture stop 20 in the projection lens 400 (the aperture stop is hereinafter referred to as "a projection lens aperture stop") and the projection lens aperture stop 20 are moved such that a focal length of the lens unit 19 becomes longer.

Although FIG. 5 illustrates the lens unit 19 as one lens, the lens unit 19 is constituted in reality by multiple lenses. In addition, since the color separation-combination system 300 including the liquid crystal panel 14 almost does not change the colors of the illumination light and the projected image due to the light limitation, FIG. 5 illustrates only the liquid crystal panels 14.

When the projection lens aperture stop 20 is moved without a change in its aperture diameter, a light exiting from the liquid crystal panel 14 and having a large angle relative to the optical axis AXL is blocked by the projection lens aperture stop 20. That is, a diameter of the effective region of the illumination light entering the liquid crystal panel 14 is decreased. The light having the large angle is generated from, of the illumination light entering the first fly-eye lens 6a, a light entering a lens cell of the first fly-eye lens 6a that is located far from a center of the first fly-eye lens 6a (that is, the optical axis AXL). On the other hand, a central light having a small angel relative to the optical axis AXL always passes through the projection lens aperture stop 20 regardless of the variation of magnification.

In this embodiment, the dichroic mirror 3 is decentered relative to the optical axis such that the optical axis direction projected region of the dichroic mirror 3 overlaps with a lens cell of the first fly-eye lens 6a that is farthest from the center thereof. This enables reducing color changes of the illumination light and the projected image associated with variation of magnification between a wide-angle end and a telephoto end.

Figure 6:
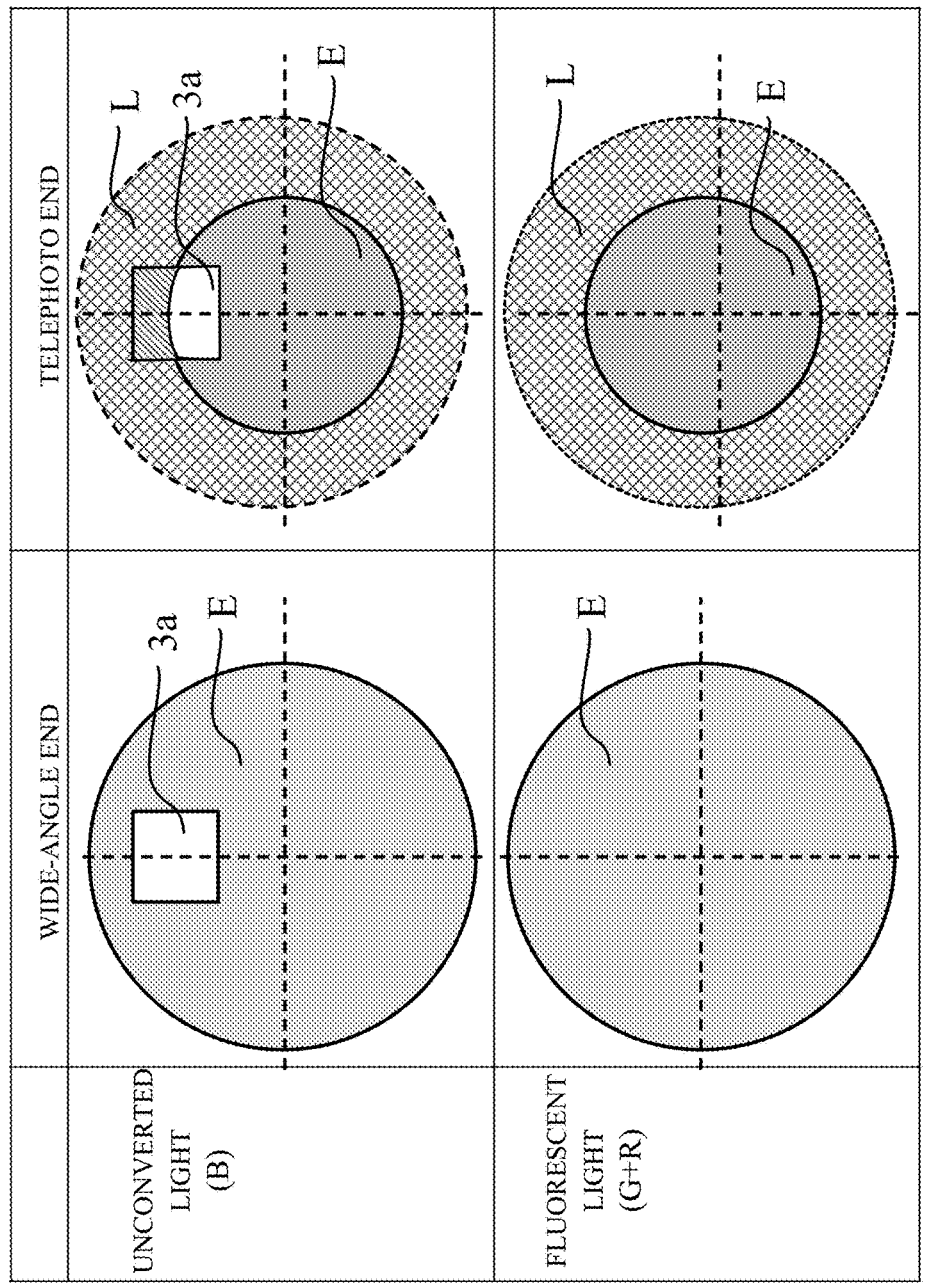
FIG. 6 illustrates light amount distributions of a fluorescent light and an unconverted light on an aperture stop surface in Embodiment 1.

FIG. 6 illustrates relations, at the wide-angle end and at the telephoto end, between the cross-sections (orthogonal to an optical axis of the first fly-eye lens 6a) of the unconverted light and the fluorescent light and the optical axis direction projected region 3a of the dichroic mirror 3.

The aperture (light-passing aperture) of the projection lens aperture stop 20 has a circular shape or a polygonal shape close to the circular shape; each shape is a rotationally symmetric shape about the optical axis AXL. That is, the fluorescent light and the unconverted light each have an effective region E as a circular or polygonal cross-section.

However, whereas the fluorescent light has an even light amount distribution in its effective region E, the unconverted light includes in its effective region E the optical axis direction projected region 3a of the dichroic mirror 3 where a light amount is approximately 0. At the wide-angle end where the cross-sectional areas of the fluorescent light and the unconverted light are both maximum, the effective region E of the unconverted light includes the whole of the optical axis direction projected region 3a of the dichroic mirror 3. That is, the unconverted light of the illumination light is made incident on the whole of the dichroic mirror 3.

A variation of magnification from the wide-angle end to the telephoto end generates a light limitation region L, which decreases the effective areas E of the fluorescent light and the unconverted light. Since the light limitation region L includes the region common to the optical axis direction projected region 3a of the dichroic mirror 3, an area (hereinafter referred to as "an unconverted light incident area") of a region where the unconverted light is made incident in the optical axis direction projected region 3a of the dichroic mirror 3 also decreases. Therefore, this embodiment enables reducing color changes of the illumination light and the projected image associated with the variation of magnification from the wide-angle end to the telephoto end.

Embodiment 2

Figure 7:
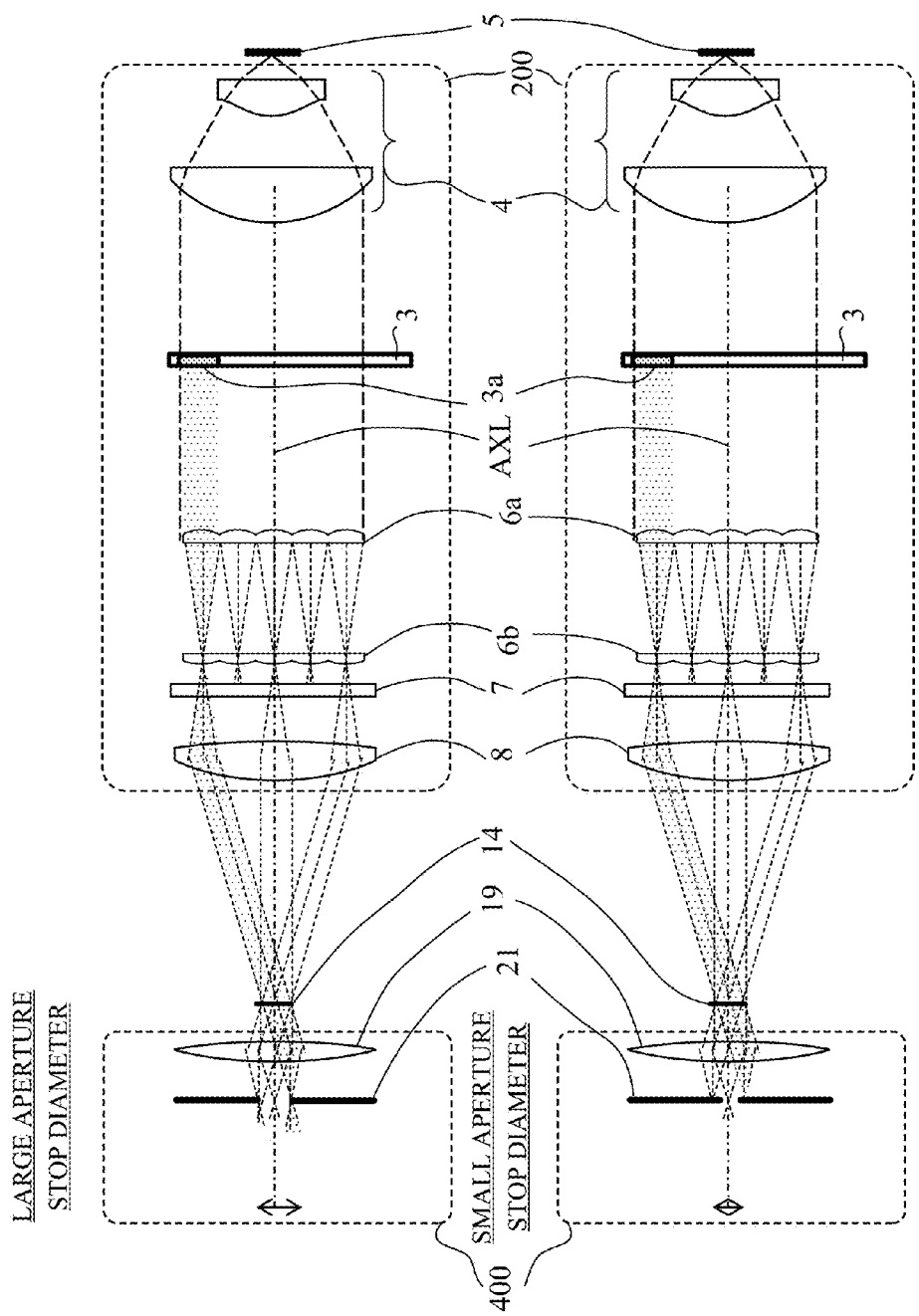
FIG. 7 illustrates a configuration of a projector that is Embodiment 2.

A second embodiment (Embodiment 2) will describe a case where the light limiter is a variable aperture stop 21 provided in the projection lens 400 with reference to FIG. 7.

The variable aperture stop 21 is capable of changing its aperture diameter (a size of its light-passing aperture) without performing variation of magnification of the projection lens 400. This embodiment will describe, for example, a case where a variable aperture stop is provided in a single focus projection lens placing priority on its imaging performance or the like. In this case, narrowing the variable aperture stop 21 enables increasing a depth of field of the projection lens 400, so that each point of the projected image projected onto a curved-surface screen or the like is in focus. Embodiment 1 described above removes an unwanted light that decreases contrast of the projected image before the color separation-combination system 300.

On the other hand, this embodiment can remove a modulated unwanted light by narrowing the aperture diameter of the variable aperture stop 21 in the projection lens 400, and thereby can improve the contrast.

Figure 8:
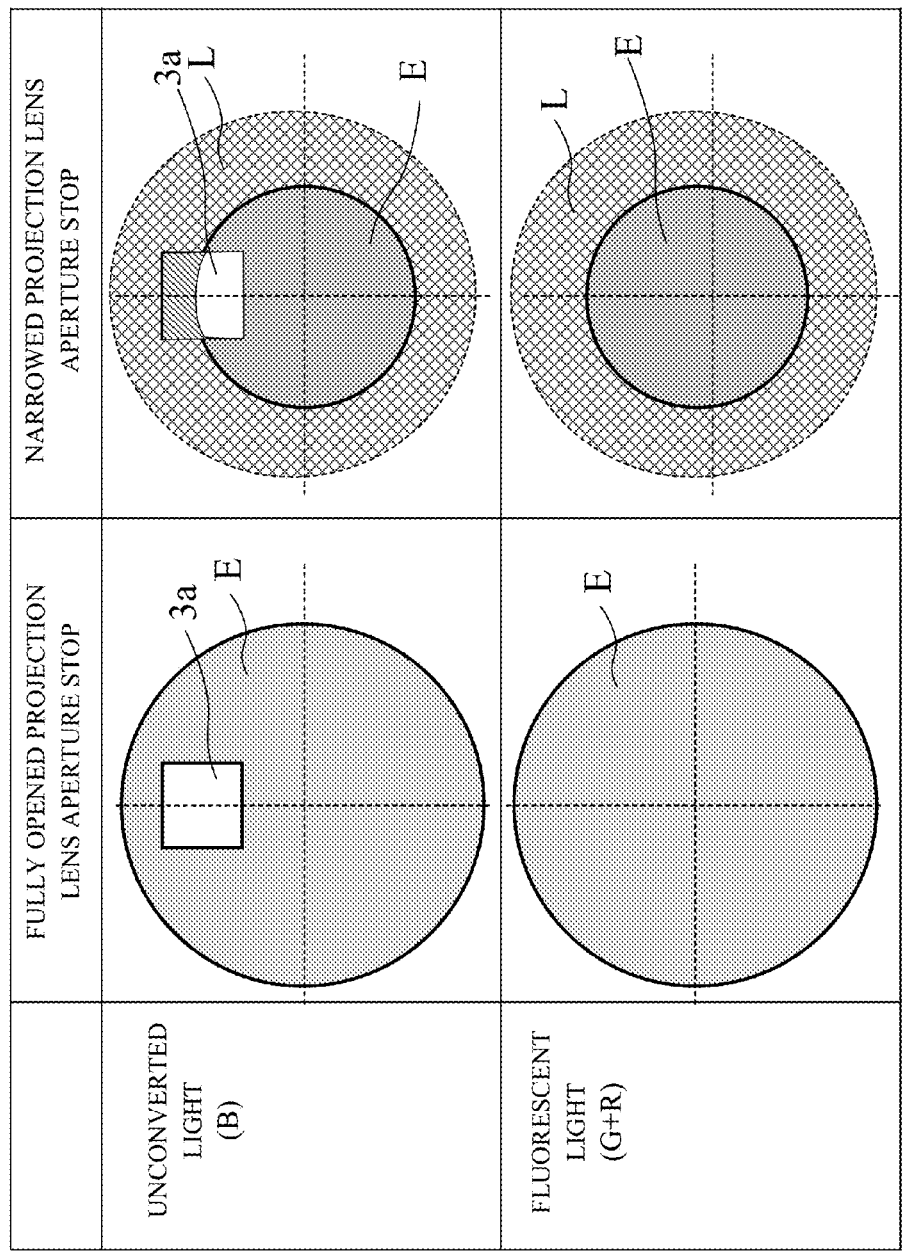
FIG. 8 illustrates light amount distributions of a fluorescent light and an unconverted light on an aperture stop surface in Embodiment 2.

FIG. 8 illustrates relations, in a fully opened state of the variable aperture stop 21 and in a narrowed state, thereof between the cross-sections (orthogonal to the optical axis of the first fly-eye lens 6a) of the unconverted light and the fluorescent light and the optical axis direction projected region 3a of the dichroic mirror 3. An aperture of the variable aperture stop 21 has a circular shape or a polygonal shape close to the circular shape; each shape is a rotationally symmetric shape about the optical axis AXL. That is, the fluorescent light and the unconverted light each have an effective region E as a circular or polygonal cross section.

However, whereas the fluorescent light has an even light amount distribution in its effective region E, the unconverted light includes in its effective region E the optical axis direction projected region 3a of the dichroic mirror 3 where a light amount is approximately 0. In the fully opened state of the variable aperture stop 21 where the cross-sectional areas of the fluorescent light and the unconverted light are both maximum, the effective region E of the unconverted light includes the whole of the optical axis direction projected region 3a of the dichroic mirror 3.

Narrowing the variable aperture stop 21 generates a light limitation region L, which decreases the effective areas E of the fluorescent light and the unconverted light. Since the light limitation region L includes the region common to the optical axis direction projected region 3a of the dichroic mirror 3, the unconverted light incident area where the unconverted light is made incident in the optical axis direction projected region 3a of the dichroic mirror 3 also decreases. Therefore, this embodiment enables reducing color changes of the illumination light and the projected image associated with the narrowing of the variable aperture stop 21.

This embodiment may be combined with Embodiment 1 so as to provide the variable aperture stop 21 in the projection lens 400 as the zoom lens.

Embodiment 3

Figure 9:
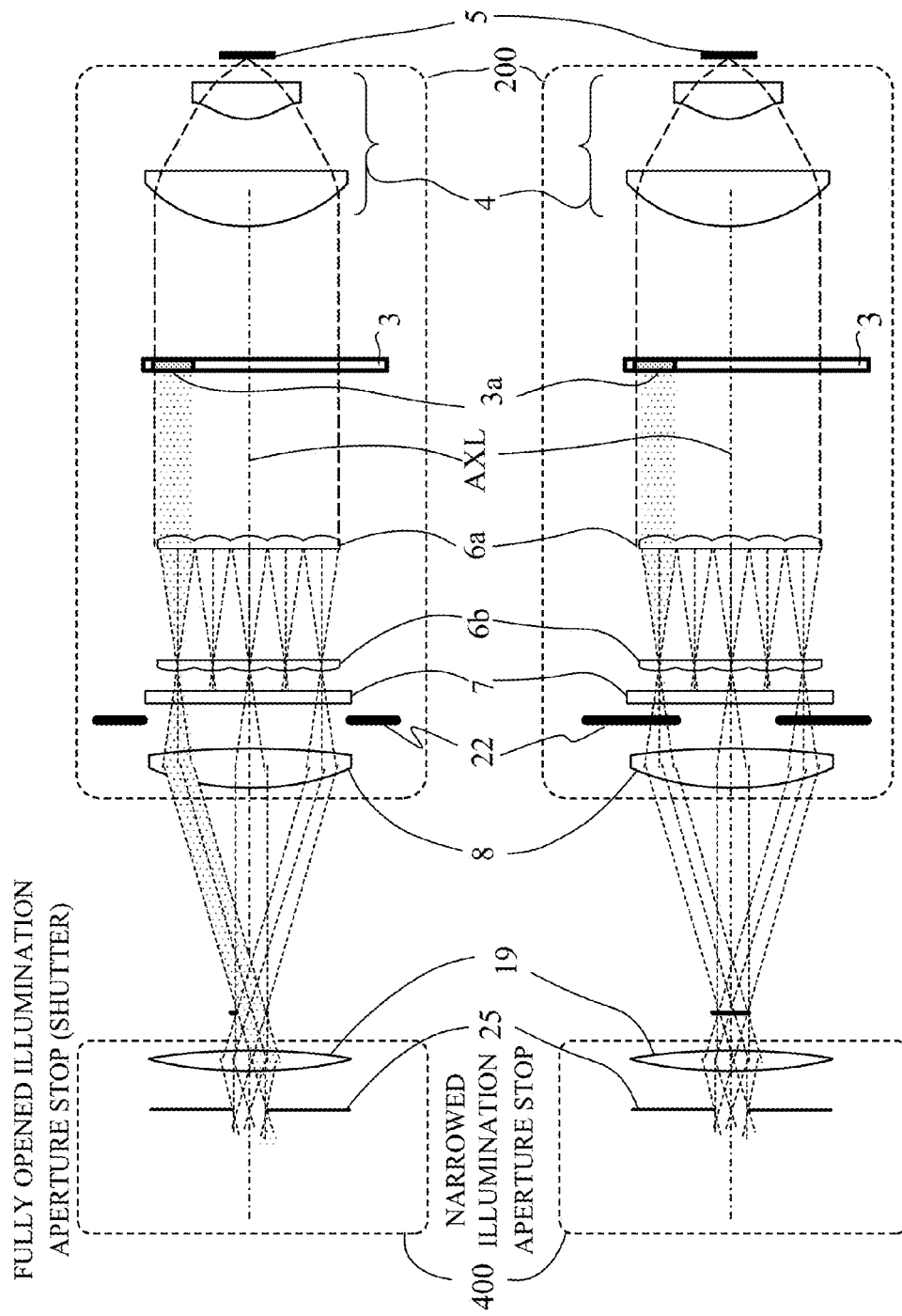
FIG. 9 illustrates a configuration of a projector that is Embodiment 3.

A third embodiment (Embodiment 3) will describe a case where the light limiter is a variable aperture stop (shutter) 22 provided in the illumination optical system 200 with reference to FIG. 9. This embodiment will describe a case where the variable aperture stop 22 is provided in the illumination optical system 200 in order to improve contrast of the projector.

One of causes that decrease the contrast of the projector is an unwanted light generated in its color separation-combination system. In a polarization beam splitter used in the color separation-combination system, off-axis rays whose incident angle to a polarization beam splitting surface of the polarization beam splitter is significantly different from that of a principal ray used for designing the polarization beam splitting surface and that should be transmitted or reflected are reflected or transmitted to be projected onto the projection surface as the unwanted light. Thus, the contrast decreases. Therefore, this embodiment provides in the illumination optical system 200 the variable aperture stop 22 in order to remove the off-axis rays reaching the polarization beam splitting surface at a large incident angle.

In FIG. 9, the first fly-eye lens 6a and the liquid crystal panel 14 have a conjugate relation through the second fly-eye lens 6b and the condenser lens 8. Limiting the off-axis rays by the variable aperture stop disposed immediately before the condenser lens 8 enables controlling a luminance on the liquid crystal panel 14 as an illumination surface. This embodiment provides the variable aperture 22 between the polarization conversion element 7 and the condenser lens 8.

Figure 10:
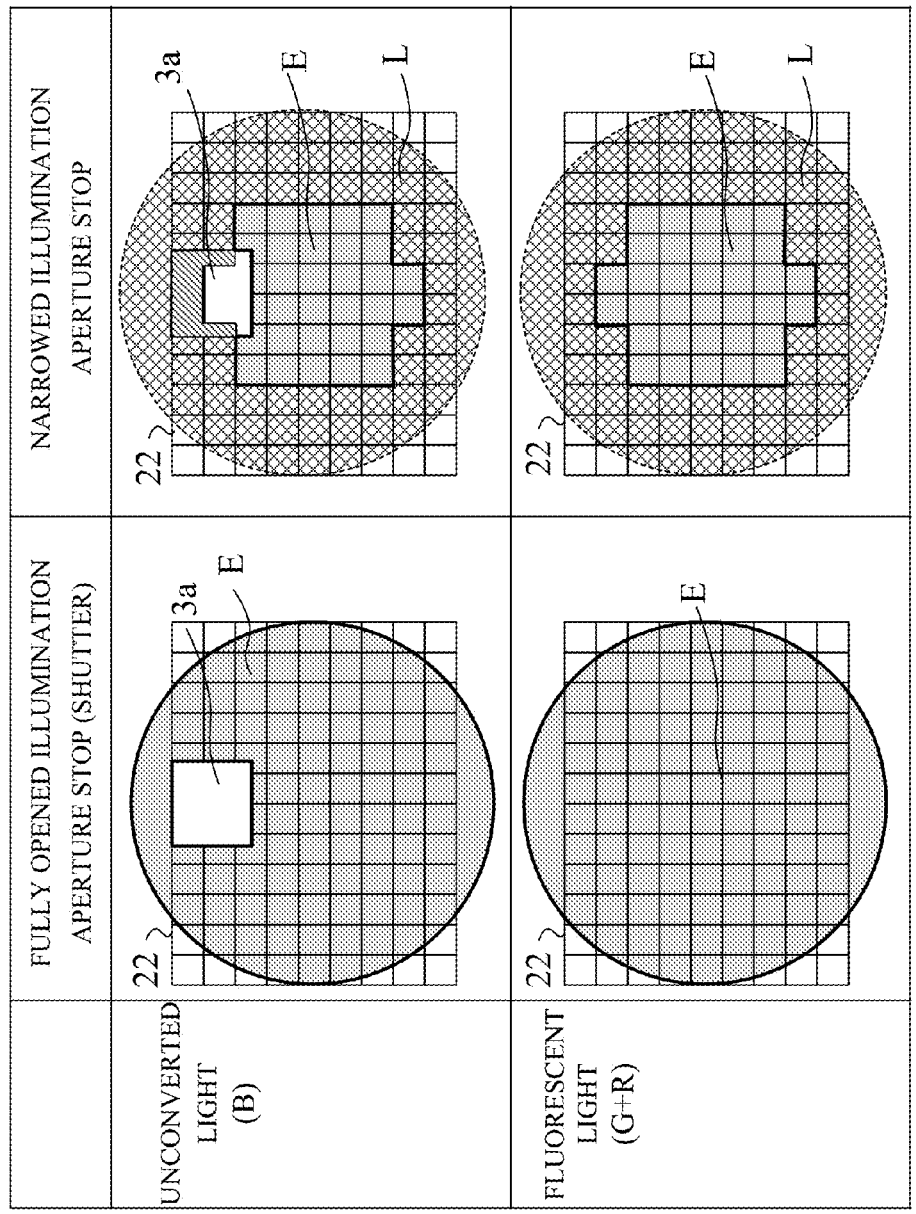
FIG. 10 illustrates light amount distributions of a fluorescent light and an unconverted light on an aperture stop surface in Embodiment 3.

FIG. 10 illustrates relations, in a fully opened state of the variable aperture stop 22 and in a narrowed state thereof, between the cross-sections (orthogonal to the optical axis of the first fly-eye lens 6a) of the unconverted light and the fluorescent light and the optical axis direction projected region 3a of the dichroic mirror 3.

It is necessary that the aperture (light-passing aperture) of the variable aperture stop 22 have a shape that reduces luminance unevenness on the illumination surface where the multiple divided light fluxes passing through the first and second fly-eye lenses 6a and 6b are mutually overlapped. Thus, this embodiment sets, not the circular or polygonal aperture shape like the variable aperture stop 21 described in Embodiment 2, but a stepwise aperture shape so as to be able to perform light blocking stepwisely in units of each cell of each fly-eye lens. That is, the fluorescent light and the unconverted light each have an effective region E as a cross section corresponding to the aperture shape of the variable aperture stop 22.

Whereas the fluorescent light has an even light amount distribution in its effective region E, the unconverted light includes in its effective region E the optical axis direction projected region 3a of the dichroic mirror 3 where a light amount is approximately 0. In the fully opened state of the variable aperture stop 22 where the cross-sectional areas of the fluorescent light and the unconverted light are both maximum, the effective region E of the unconverted light includes the whole of the optical axis direction projected region 3a of the dichroic mirror 3.

Narrowing the variable aperture stop 22 generates a light limitation region L, which decreases the effective areas E of the fluorescent light and the unconverted light. Since the light limitation region L includes the region common to the optical axis direction projected region 3a of the dichroic mirror 3, the unconverted light incident area in the optical axis direction projected region 3a of the dichroic mirror 3 also decreases. Therefore, this embodiment enables reducing color changes of the illumination light and the projected image associated with narrowing of the variable aperture stop 22.

Embodiment 4

Figure 11:
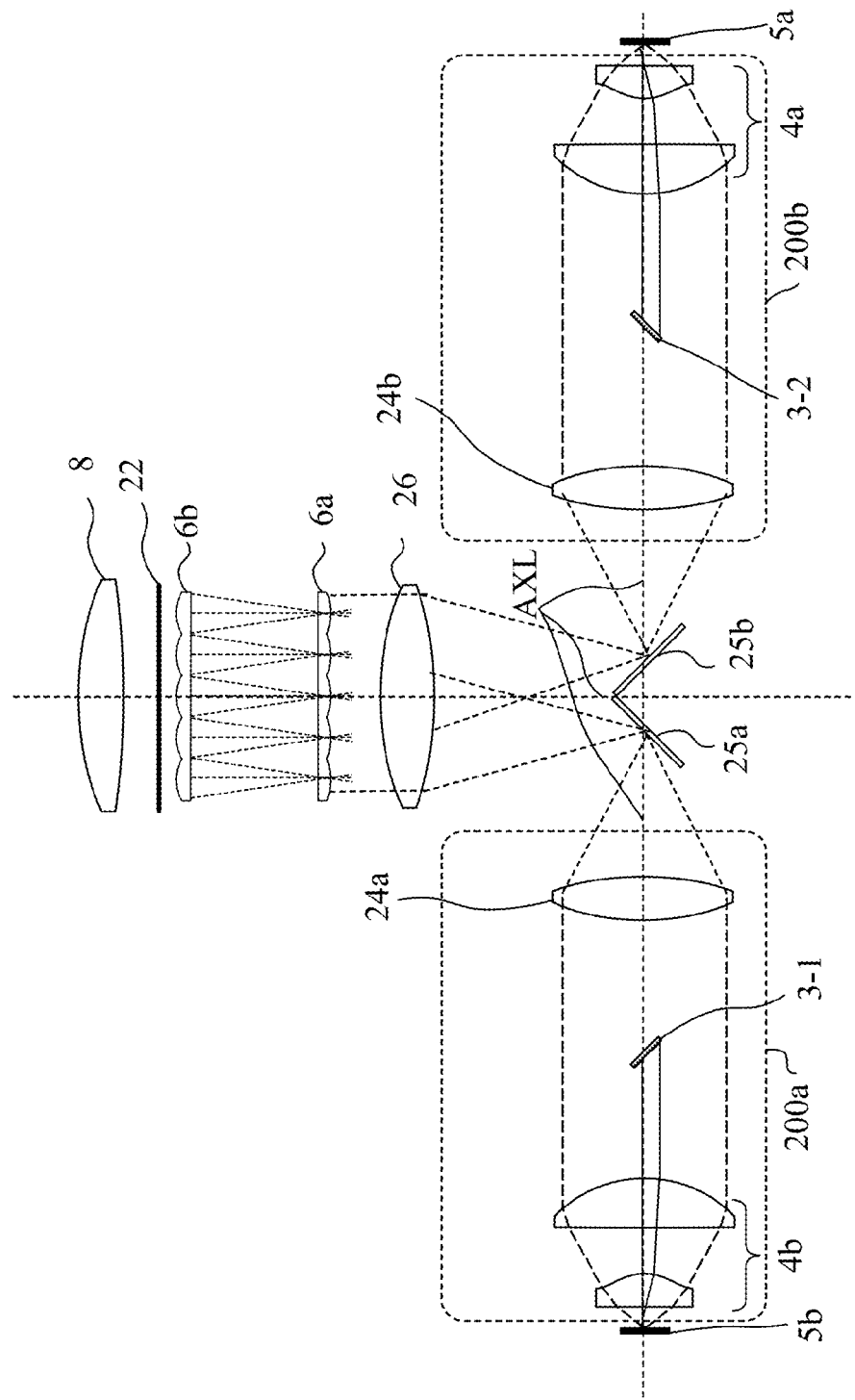
FIG. 11 illustrates a configuration of a projector that is Embodiment 4.
Figure 12:
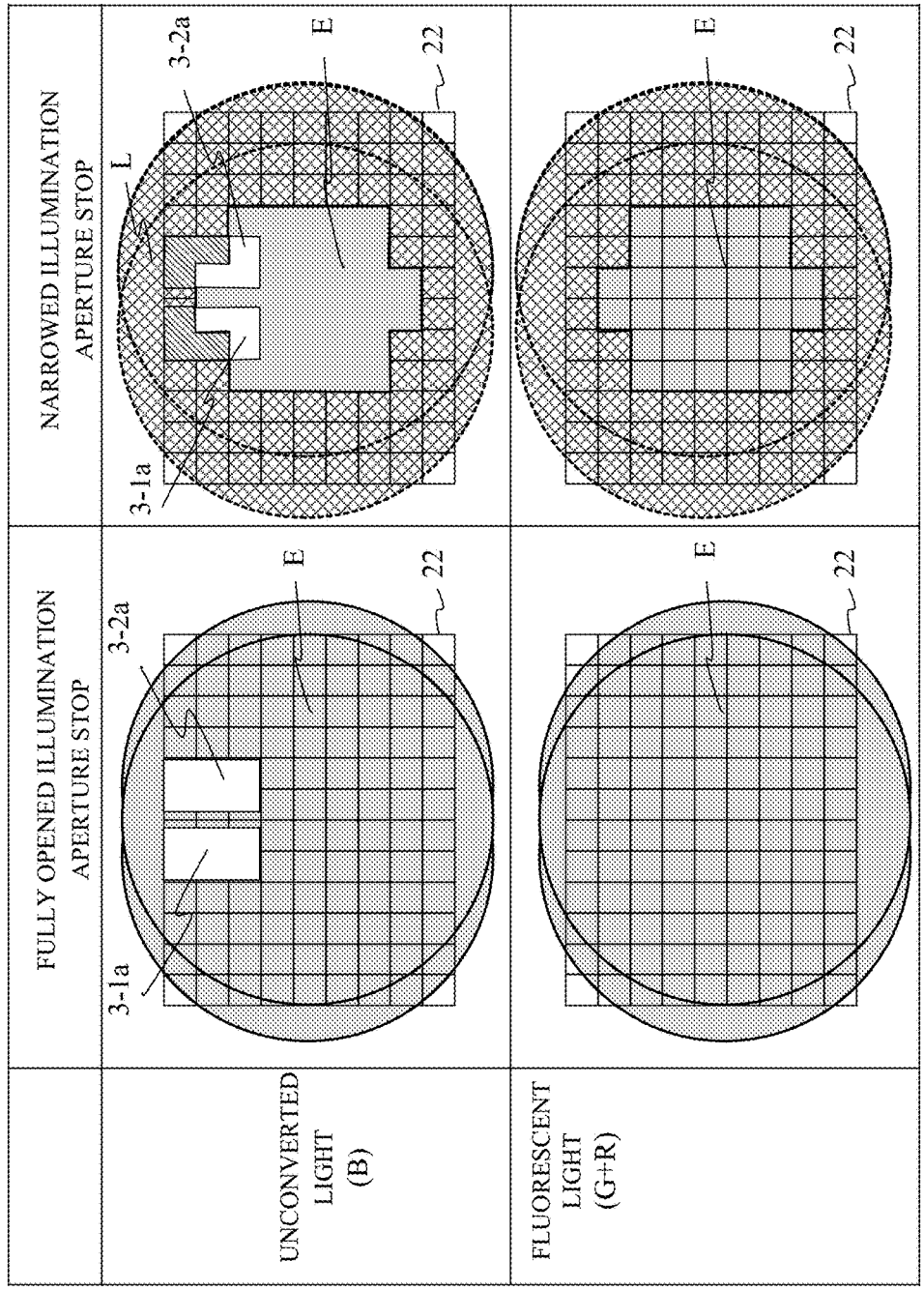
FIG. 12 illustrates light amount distributions of a fluorescent light and an unconverted light on an aperture stop surface in Embodiment 4.

A fourth embodiment (Embodiment 4) will describe a multi-light source projector including multiple (for example, two) fluorescent body units 5a and 5b, dichroic mirrors 3-1 and 3-2, and LD light sources (not illustrated) with reference to FIGS. 11 and 12. As illustrated in FIG. 11, this embodiment provides, as with Embodiment 3, the variable aperture stop (shutter) 22 in the illumination optical system 200.

In the fluorescent body unit, concentration of a high-energy exciting light on the fluorescent body causes a deterioration of the fluorescent body and a saturation of wavelength conversion, which decreases a wavelength conversion efficiency of the fluorescent body. Therefore, this embodiment provides the multiple LD light sources and the multiple fluorescent body units, and combines the illumination lights from the respective fluorescent body units to illuminate a liquid crystal panel with the combined illumination light.

This embodiment provides, before the first fly-eye lens 6a, lenses 24a and 24b collecting the illumination lights from the multiple fluorescent body units 5a and 5b, and reflective surfaces 25a and 25b reflecting the collected illumination lights. Furthermore, this embodiment provides a lens 26 collimating the reflected illumination lights to cause the collimated illumination lights to enter the first fly-eye lens 6a.

FIG. 12 illustrates relations, in a fully opened state of the variable aperture stop 22 and in a narrowed state thereof, between the cross-sections (orthogonal to the optical axis of the first fly-eye lens 6a) of the unconverted light and the fluorescent light and optical axis direction projected regions 3-1a and 3-2a of the dichroic mirrors 3-1 and 3-2.

As in Embodiment 3, whereas the fluorescent has an even light amount distribution in its effective region E, the unconverted light includes in its effective region E optical axis direction projected regions 3-1a and 3-2a of the dichroic mirrors 3-1 and 3-2 in each of which a light amount is approximately 0. In the fully opened state of the variable aperture stop 22 where the cross-sectional areas of the fluorescent light and the unconverted light are both maximum, the effective region E of the unconverted light includes the whole of the optical axis direction projected regions 3-1a and 3-2a of the dichroic mirrors 3-1 and 3-2.

Although FIG. 12 illustrates an example in which the optical axis direction projected regions 3-1a and 3-2a of the dichroic mirrors 3-1 and 3-2 have a symmetric relation with respect to a plane passing through a position of the optical axis AXL, these optical axis direction projected regions 3-1a and 3-2a may have other relations.

Narrowing the variable aperture stop 22 generates a light limitation region L, which decreases the effective areas E of the fluorescent light and the unconverted light. Since the light limitation region L includes the region common to the optical axis direction projected regions 3-1a and 3-2a of the dichroic mirrors 3-1 and 3-2, unconverted light incident areas in the optical axis direction projected regions 3-1a and 3-2a of the dichroic mirrors 3-1 and 3-2 also decrease. Therefore, this embodiment enables, in the multi-light source projector, reducing color changes of the illumination light and the projected image associated with narrowing of the variable aperture stop 22.

As described above, each embodiment can reduce, while including the reflective-transmissive surface in the optical path of the illumination light from the polarization conversion element, color changes of the illumination light and the projected image associated with a change of the cross-sectional area of the illumination light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-175191, filed on Sep. 8, 2016, which is hereby incorporated by reference herein in its entirety.

What is claimed is:
1. An image projection apparatus comprising:
a wavelength conversion element configured to convert part of a first light into a second light whose wavelength is different from that of the first light to generate an illumination light including the first and second lights;
an illumination optical system including:
  a reflective-transmissive surface that has a dichroic characteristic of reflecting the first light and transmitting the second light; and
  a collector lens unit disposed between the reflective-transmissive surface and the wavelength conversion element, and
  configured to:
    guide the first light reflected by the reflective-transmissive surface to the wavelength conversion element; and allow the illumination light to exit from the illumination optical system while making part of the illumination light incident on the reflective-transmissive surface; and an image light producer configured to produce, using the illumination light from the illumination optical system, an image light for displaying a projected image, the image light being projected to a projection surface via a projection optical system, wherein:

when viewed from an optical axis of the collector lens unit, an area of the reflective-transmissive surface is smaller than an area of the collector lens unit, and the reflective-transmissive surface is configured so that:
an incident area of the illumination light on the reflective-transmissive surface decreases with a decrease in a sectional area of the illumination light; and
the incident area of the illumination light increases with an increase in the sectional area of the illumination light.

2. The image projection apparatus according to claim 1, wherein:

the incident area of the illumination light on the reflective-transmissive surface always decreases simultaneously with the decrease in the sectional area of the illumination light, and the incident area of the illumination light always increases simultaneously with the increase in the sectional area of the illumination light.

3. The image projection apparatus according to claim 1, wherein:

an amount of the first light reflected by the reflective-transmissive surface decreases with the decrease in the incident area on the reflective-transmissive surface, and the amount of the first light reflected by the reflective-transmissive surface increases with the increase in the incident area on the reflective-transmissive surface.

4. The image projection apparatus according to claim 1, wherein:

the illumination optical system has an optical axis, and the reflective-transmissive surface is decentered relative to the optical axis.

5. The image projection apparatus according to claim 4, wherein the reflective-transmissive surface is decentered relative to the optical axis so that the illumination light whose sectional area is maximum is made incident on entirety of the reflective-transmissive surface.

6. The image projection apparatus according to claim 1, further comprising a light limiter that:

is included in the projection optical system, and changes the sectional area of the illumination light due to variation of magnification of the projection optical system.

7. The image projection apparatus according to claim 1, further comprising a light limiter that:

is included in the illumination optical system or the projection optical system, and includes a variable aperture stop whose light passing aperture is variable in area.

* * * * *